United States Patent
Konagaya

(10) Patent No.: US 6,985,217 B2
(45) Date of Patent: Jan. 10, 2006

(54) SYSTEM AND METHOD FOR INSPECTING A LIGHT SOURCE OF AN IMAGE READER

(75) Inventor: Tatsuya Konagaya, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 487 days.

(21) Appl. No.: 10/071,182

(22) Filed: Feb. 11, 2002

(65) Prior Publication Data
US 2002/0109832 A1    Aug. 15, 2002

(30) Foreign Application Priority Data
Feb. 13, 2001   (JP) ............... 2001-035389

(51) Int. Cl.
G01J 1/00    (2006.01)
(52) U.S. Cl. ............... 356/121; 356/237.1; 356/237.5
(58) Field of Classification Search ............... 356/121, 356/237.1, 237.5; 382/141; 250/216, 553, 250/559.05, 559.06, 559.07, 559.08
See application file for complete search history.

(56) References Cited
U.S. PATENT DOCUMENTS
5,847,754 A * 12/1998 Thornton .................... 348/97

FOREIGN PATENT DOCUMENTS

| JP | 401282439 A | * | 11/1989 |
| JP | 406113078 A | * | 4/1994 |
| JP | 408137413 A | * | 5/1996 |
| JP | 2000136982 A | * | 5/2000 |

* cited by examiner

Primary Examiner—Hwa (Andrew) Lee
Assistant Examiner—Roy M. Punnoose
(74) Attorney, Agent, or Firm—Sughrue Mion, PLLC

(57) ABSTRACT

An area CCD scanner (image reader) comprises an LED unit (light source), an area CCD and an image-forming lens. The LED unit includes a large number of light emitting elements of each color of blue, green, red and infrared. Light emitted from the LED unit and having passed through a photographic film is received by the area CCD and is converted into an electric signal, which is outputted as photographic image data. When the light source is inspected, a focal point of the image-forming lens is adjusted to a light emitting surface of the LED unit. Then, the LED unit is turned on without setting the photographic film to receive the light thereof with the area CCD. On the basis of the obtained electric signal, a light-emission state of the LED unit is shown on a display.

35 Claims, 8 Drawing Sheets

SYSTEM AND METHOD FOR INSPECTING A LIGHT SOURCE OF AN IMAGE READER

BACKGROUND OF THE INVENTION

1. Field of the Invention

The present invention relates to a system and a method for inspecting a light source included in an image reader comprising a photoelectric converter.

2. Description of the Related Art

Image readers of a reflection-original scanner, a photo-film scanner and so forth are known. In such image readers, an image recorded on an original is photoelectrically read. The image reader comprises a light source and a phtooelectric converter. The light source emits the light to the original. The photoelectric converter receives the light and converts it into an electric signal to be outputted.

As to the photoelectric converter, a charge coupled device (CCD) is used, for example. As to the light source, an LED unit is used, for example. The LED unit includes a large number of light emitting elements, which are arranged to emit the light of respective colors of blue (B), green (G) and red (R). Further, the LED unit includes another light emitting element for radiating infrared rays (IR) used for detecting dust, a scratch and so forth on a photographic film. The infrared rays are also used for detecting positions of the dust, the scratch and so forth. On the basis of data obtained by using the infrared rays, image correction is executed.

In case some of the light emitting elements fail or a driver for controlling them fails, some of the light emitting elements are not turned on and a light amount thereof decreases. If such failure of the light source occurs on the light emitting elements of B, G and R, the light amount lacks on a print surface and unevenness of the light amount is likely to be caused thereon. Meanwhile, if such failure occurs on the light emitting element of the infrared rays, it becomes impossible to correct the dust, the scratch and so forth of the photographic film. In view of this, the light source is periodically inspected or is inspected as occasion demands, in order to confirm lighting states of the respective light emitting elements.

For example, the light source is inspected by watching the LED unit in a state that the light emitting elements are turned on every color. With respect to the light emitting elements of R, G and B, the lighting state thereof is confirmed by directly viewing each color of the light. With respect to the light emitting element of the infrared rays, the lighting state thereof is confirmed by viewing the infrared rays through an IR scope, because it is invisible.

However, there is a problem in that it is difficult to find the broken light emitting element, since a large number of the light emitting elements are arranged in extremely short intervals. Moreover, there is another problem in that an inspecting operation is troublesome, since the IR scope and so forth are necessary to inspect the light emitting elements of the infrared rays. In addition, when light intensity of the light emitting element is high, there is a possibility that a human eye is affected by directly watching it.

SUMMARY OF THE INVENTION

In view of the foregoing, it is a primary object of the present invention to provide a system and a method for inspecting a light source of an image reader, in which the light source is inspected with great accuracy.

It is a second object of the present invention to provide a system and a method for inspecting a light source of an image reader, in which the light source is easily inspected.

It is a third object of the present invention to provide a system and a method for inspecting a light source of an image reader, in which a human eye is not affected.

In order to achieve the above and other objects, the system and the method for inspecting the light source according to the present invention utilizes a photoelectric converter for converting the light, which is emitted from the light source to an original, into an electric signal. The photoelectric converter converts the light into the electric signal to read an image recorded on the original.

The light source includes a large number of light emitting elements. The photoelectric converter receives the light emitted from the respective light emitting elements to obtain the photoelectric signal. On the basis of the obtained photoelectric signal, light-emission states of the respective light emitting elements are shown on a display to inspect whether each of the light emitting elements fails or not.

When a diffusion member for diffusing the light of the light emitting element is disposed at an optical path between the light source and the photoelectric converter, the diffusion member is removably attached. It is preferable to remove the diffusion member when displaying the light-emission states of the light emitting elements on the display.

An image-forming lens is disposed at the optical path between the light source and the photoelectric converter. The image-forming lens is movable between a first position where the image of the original is formed on the photoelectric converter, and a second position where an image of the light source is formed on the photoelectric converter. When the light-emission states of the light emitting elements are shown on the display, the image-forming lens is set to the second position.

In a preferred embodiment, the light-emission states are shown on the display so as to correspond to an arrangement of the light emitting elements. An inspector judges a defect of the light source by watching the light-emission states shown on the display. Incidentally, the light source may include the light emitting element, which emits the infrared rays.

In another embodiment, a judgement member is provided for automatically judging the defect of the light source. The judgement member inspects the light-emission state of the respective light emitting elements. Based on a result of the inspection, the defect of the light source is automatically judged by the judgement member.

According to the present invention, the light source may be easily inspected without an inspecting tool of an IR scope and so forth. Moreover, the light source is not directly watched so that a human eye is not affected.

When the light-emission state is shown on the display, the diffusion member disposed between the light source and the photoelectric converter is removed and a focal point of the image-forming lens is adjusted to the light source. Therefore, the light source may be inspected with accuracy.

The defective light source may be automatically judged by the judgement member on the basis of the light-emission state of the respective light emitting elements. Thus, the light source is inspected more easily and more accurately.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
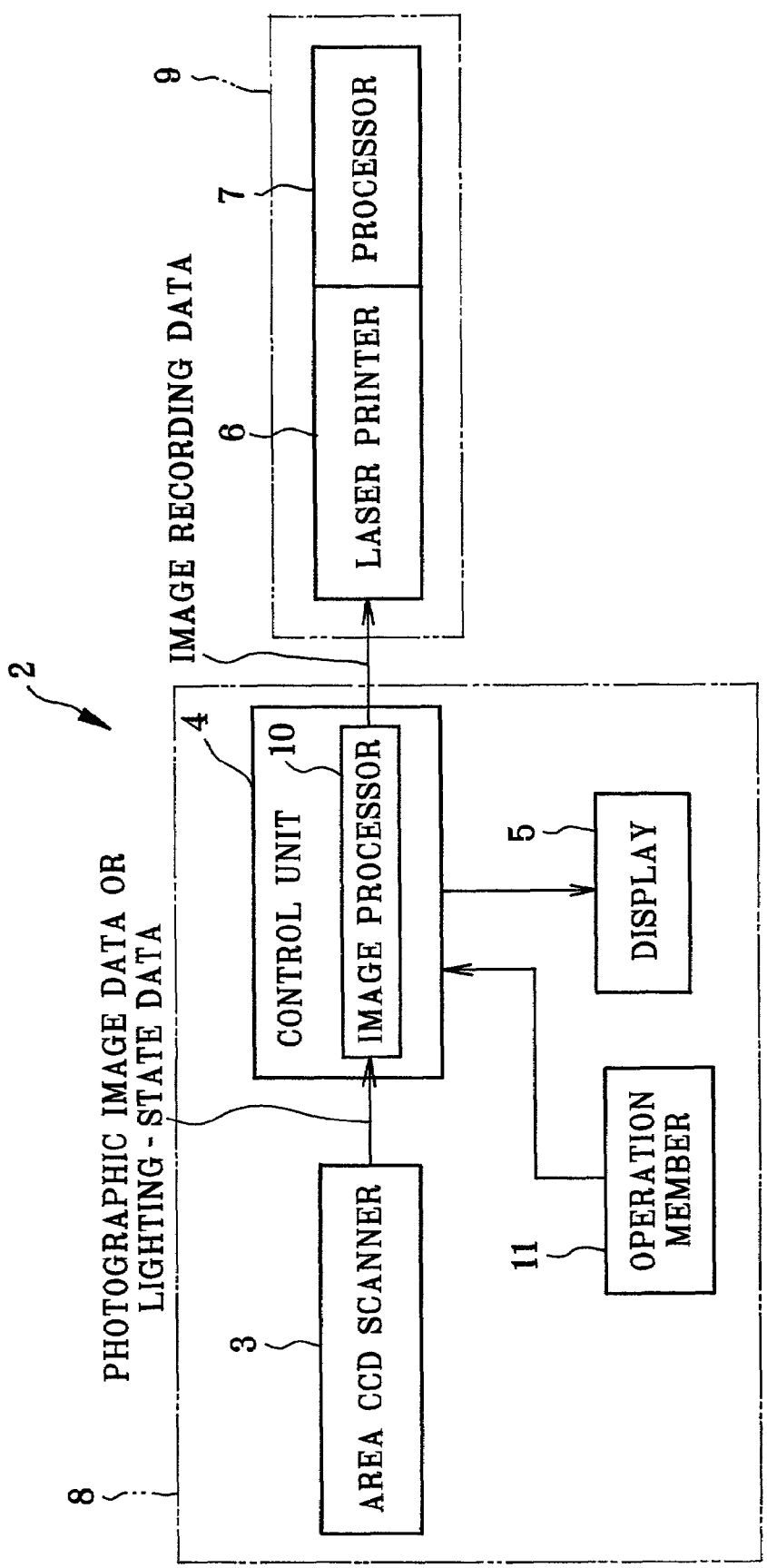
FIG. 1 is a block diagram showing a structure of a digital print system.

A digital print system 2 shown in FIG. 1 includes an area CCD scanner 3, a control unit 4, a display 5, a laser printer 6, and a processor 7. The area CCD scanner 3, which is an image reader, is unified with the control unit 4, the display 5, and an operation member 11 as an input apparatus 8. The laser printer 6 and the processor 7 are unified as an output apparatus 9.

The display 5 shows an operational picture and an image read by the area CCD scanner 3. The operation member 11 comprises a mouse and a keyboard. An operator manipulates the operation member 11, watching the operational picture, to input various commands into the control unit 4. In accordance with the inputted command, the control unit 4 controls each section of the input apparatus 8 and the output apparatus 9.

As well known, the laser printer 6 comprises a laser exposure unit, which includes laser-beam sources of R, G and B, a polygonal mirror, an f·θ lens, a reflection mirror, and so forth. The laser printer 6 records a latent image on a color paper in accordance with image recording data sent from the input apparatus 8. The processor 7 executes a developing process on the recorded color paper.

The input apparatus 8 has two operating modes of an image reading mode and an inspecting mode. The image reading mode is a regular mode under which an image of each frame of a photographic film 21 is read. The read image is sent to the output apparatus 9 for printing. Meanwhile, the inspecting mode is a mode for inspecting a light source of the area CCD scanner 3. Under the inspecting mode, the input apparatus 8 works as an inspection system of the light source. Upon activating the input apparatus 8, a mode selection menu is shown on the display 5 to select either of the operating modes.

The control unit 4 comprises a CPU, a memory, a storage for storing various data, an image processor 10, and so forth. The storage stores programs for operating the input apparatus 8 under the respective modes thereof. The CPU loads the program into the memory to execute it.

During the image reading mode, the image processor 10 executes various image processes on the photographic image data read by the area CCD scanner 3. The image processes include density correction, color correction, sharpness processing, and so forth. The processed photographic image data is converted into the image recording data and is sent to the laser printer 6. Meanwhile, in the inspecting mode, is formed an inspection image representing a light-emission state of the light source of the area CCD scanner 3. The inspection image is shown on the display 5.

Figure 2:
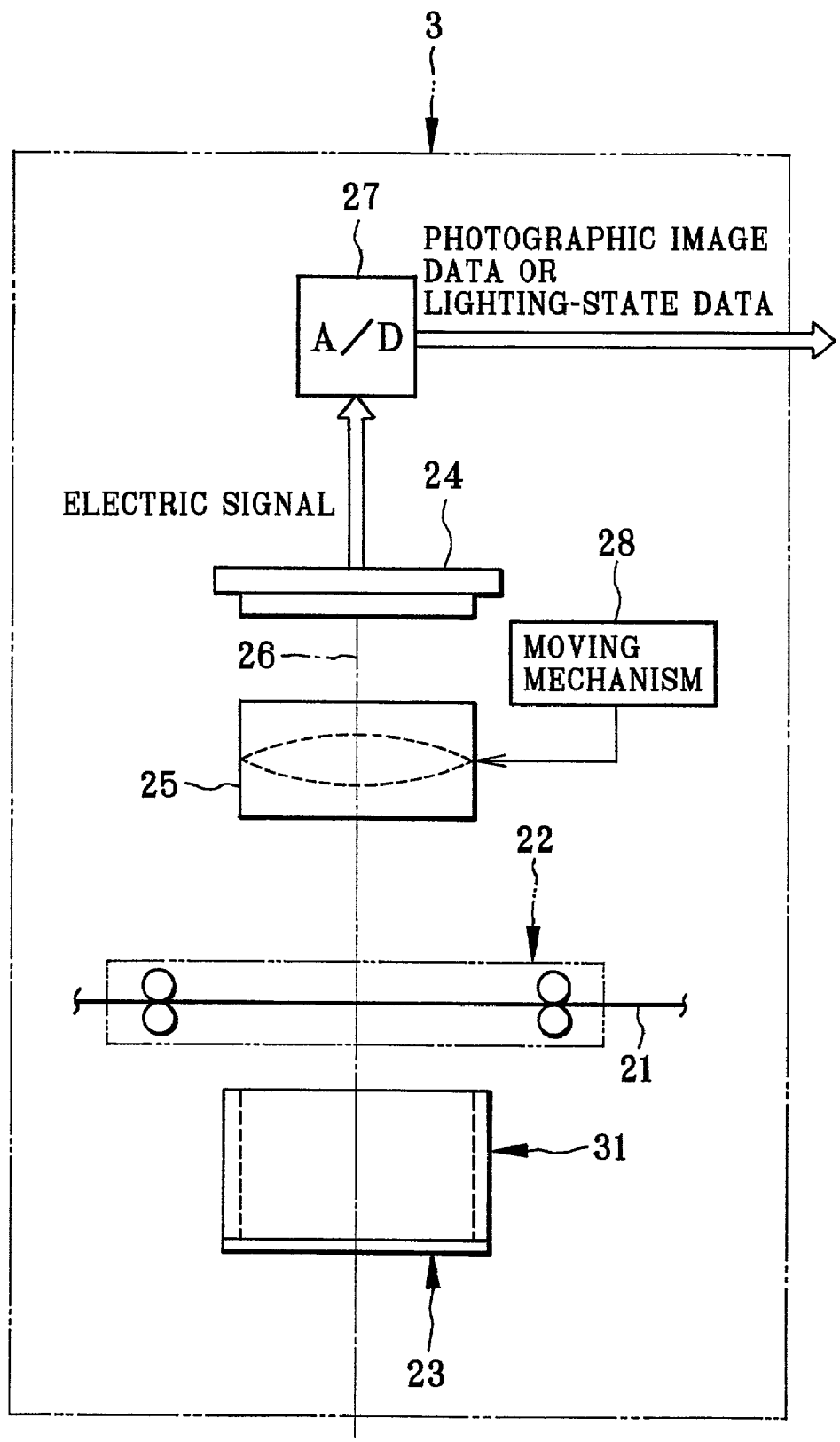
FIG. 2 is a schematic illustration showing a structure of an area CCD scanner.

As shown in FIG. 2, the area CCD scanner 3 comprises a film carrier 22, an LED unit 23, an area CCD 24, and an image-forming lens 25. The film carrier 22 conveys the photographic film 21 placed thereon. The LED unit 23 is a light source for emitting the light of each color of blue, green, red and infrared. The LED unit 23 emits the light to the photographic film 21. The area CCD 24 is disposed at an opposite side of the LED unit 23 relative to the film carrier 22. The image-forming lens 25 is disposed at an optical path 26 between the LED unit 23 and the area CCD 24.

The image-forming lens 25 is movable between a first position where the image of the photographic film 21 is formed on the area CCD 24, and a second position where a lighting surface of the LED unit 23 is formed on the area CCD 24. A moving mechanism 28 moves the image-forming lens 25 between the first position and the second position. The image-forming lens 25 is set to the first position under the image reading mode, and is set to the second position under the inspecting mode.

As well known, the area CCD 24 is a photoelectric converter for converting the received light into an electric signal. In the image reading mode, the area CCD 24 receives the light emitted from the LED unit 23 and having passed through the photographic film 21. The photoelectric signal converted by the area CCD 24 is digitized by an A-D converter 27 so as to be digital data. This digital data is taken into the image processor 10 as the photographic image data.

When reading the image from the photographic film 21, there are two manners of pre-scanning and fine scanning. During the fine scanning, the image is read at high resolution in comparison with the pre-scanning. The pre-scanning is carried out when the image of each frame is previewed on the display 5. The fine scanning is carried out at the time of printing to produce the recording image data.

The LED unit 23 emits the light of each color of blue, green, red, and infrared in a sequential manner. The light emitted from the LED unit 23 is received by the area CCD 24. And then, the light of the respective colors are converted into blue-image data, green-image data, red-image data, and infrared-image data respectively. Each image data is taken into the image processor 10.

Infrared rays are used for detecting a position of dust attaching to the photographic film, and are also used for detecting a position of a scratch caused on the photographic film. On the basis of the infrared-image data, the control unit 4 detects the positions of the dust and the scratch to execute a correction process.

In the inspecting mode, the area CCD 24 directly receives the light emitted from the LED unit 23, and outputs the received light as an electric signal. This electric signal is converted into digital data by the A-D converter 27. The converted data is taken into the image processor 10 as lighting-state data, which represents a light-emission state of the LED unit 23. The image processor 10 forms an inspection image on the basis of the lighting-state data to output it to the display 5.

Although the area CCD 24 directly receives the light emitted from the LED unit 23, the area CCD 24 may receive the light passing through a filter disposed between the LED unit 23 and the area CCD 24, for example. Incidentally, such a filter has fixed density for the whole surface thereof.

Between the LED unit 23 and the film carrier 22, a diffusion member 31 is disposed along the optical path 26. The diffusion member 31 is formed in a square-cylindrical shape, for instance, and an inner surface thereof is a reflection surface. The light emitted from the LED unit 23 goes straight to directly enter the photographic film 21. At this time, the light of the LED unit 23 is partially reflected by the reflection surface of the diffusion member 31 to enter the photographic film 21.

The LED unit 23 is constituted of a large number of the light emitting elements. If some of the light emitting elements fail, a light amount of a corresponding portion decreases. Decrement of the light amount deteriorates an ability of reading the image. Moreover, in this case, the light amount is partially reduced so that unevenness of the light amount is likely to occur on a picture. The diffusion member 31 diffuses the light to prevent the unevenness of the light amount from occurring.

By the way, if the light of the respective light emitting elements diffuses when inspecting the light-emission state thereof, it is difficult to check the state. In view of this, the diffusion member 31 is detachably attached so as to be removed when inspecting the light source. By removing the diffusion member 31 at the time of inspection, the light of the respective light emitting elements is prevented from diffusing. Thus, the clear inspection image is formed so that the light-emission state of the light source may be easily confirmed.

Figure 3:
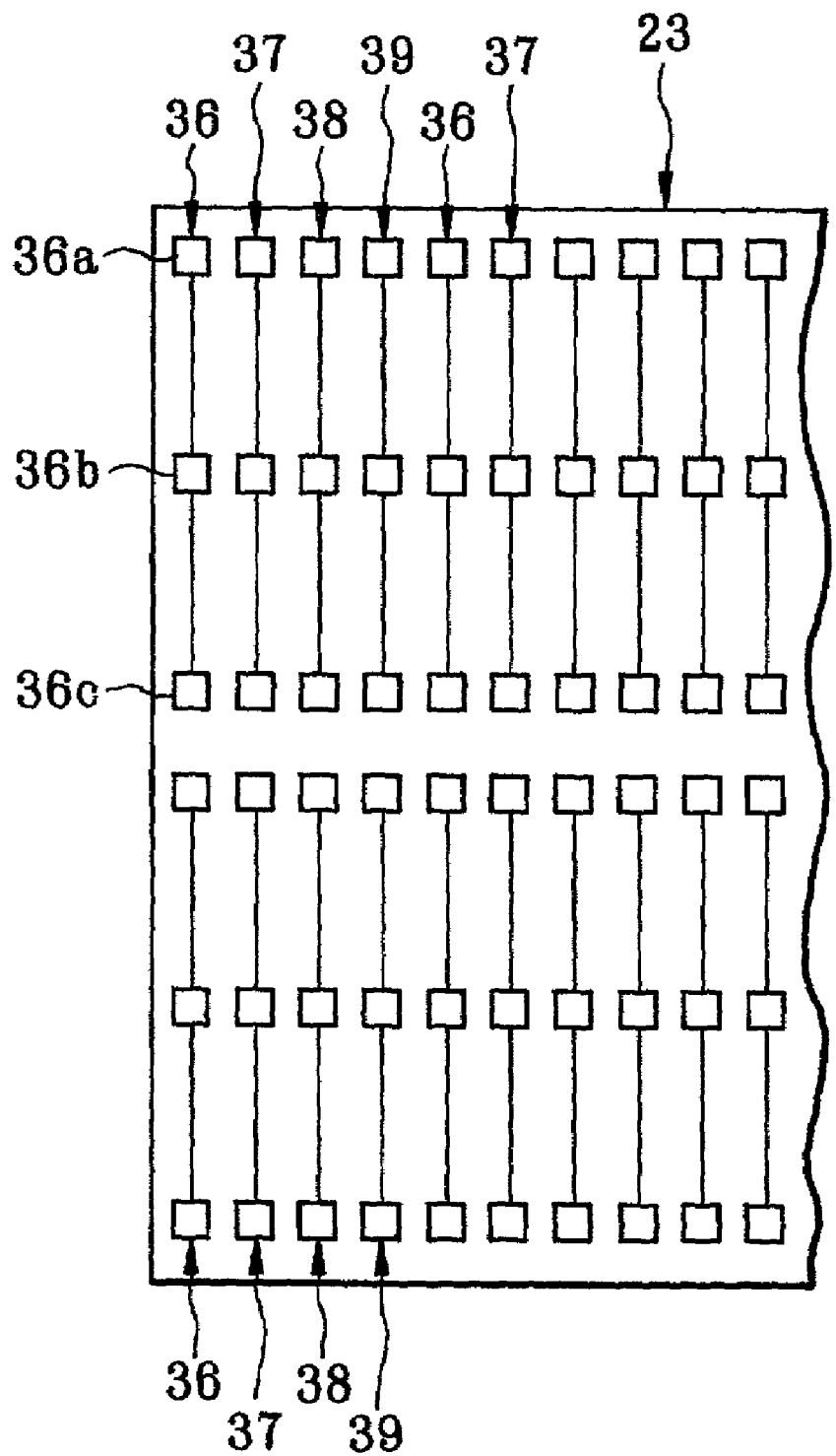
FIG. 3 is an explanatory illustration showing an arrangement of light emitting elements of an LED unit.

As shown in FIG. 3, the LED unit 23 comprises a first set 36 of the blue-light emitting elements, a second set 37 of the green-light emitting elements, a third set 38 of the red-light emitting elements, and a fourth set 39 of the infrared-light emitting elements. Each of the sets 36 to 39 includes three light emitting elements. Concretely, the set 36 includes three light emitting elements 36a, 36b and 36c, which are wired in series. The other sets are similar so that explanation thereof is abbreviated.

An arrangement area of the sets 36 to 39 of the respective light emitting elements is divided into two areas of an upper portion and a lower portion, in each of which the sets 36 to 39 are repeatedly arranged from one side in an order of blue, green, red and infrared. In each portion, for instance, the first sets 36 are provided by five rows, and the other sets 37 to 39 are respectively provided by four rows.

Figure 4:
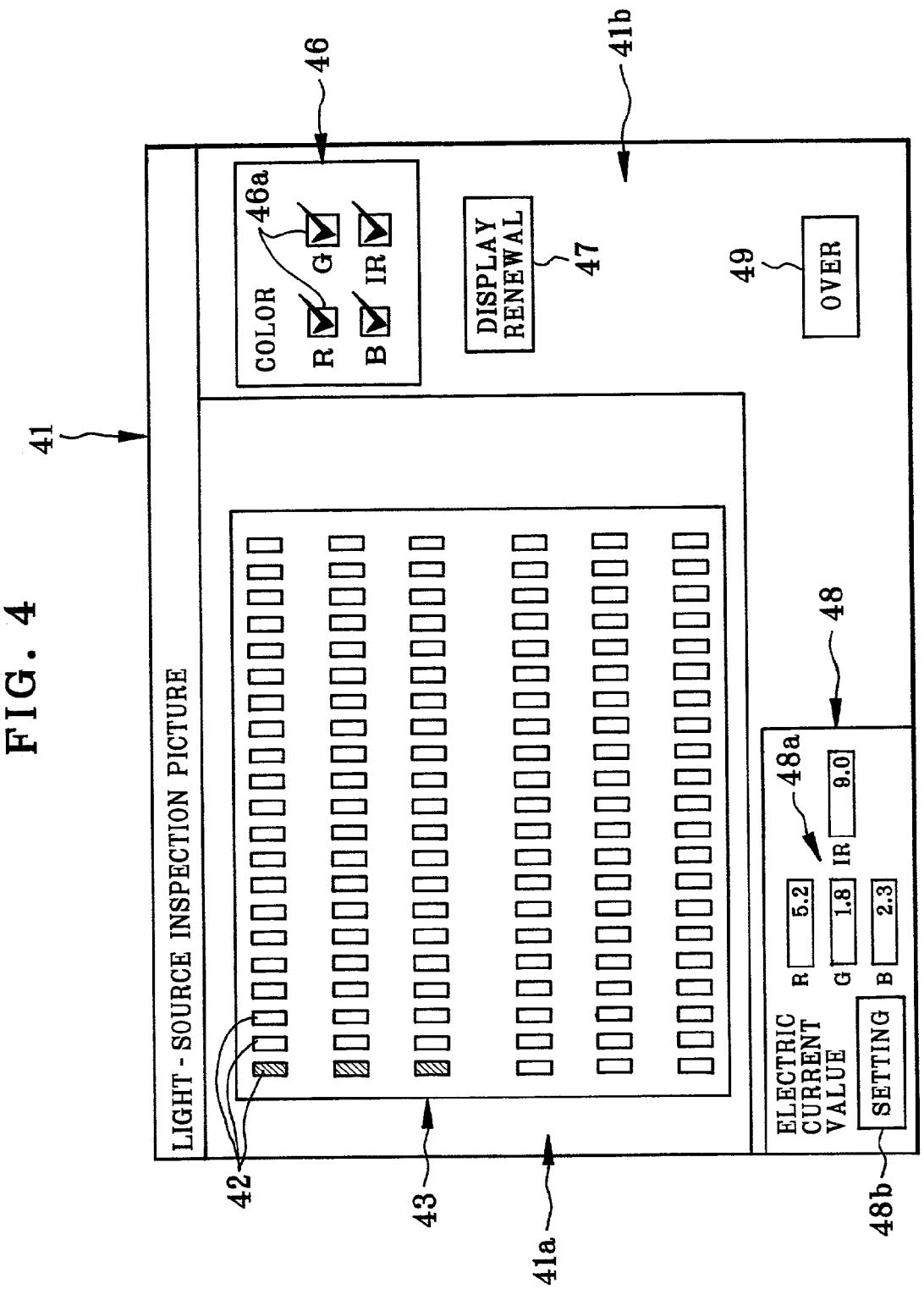
FIG. 4 is an explanatory illustration showing a picture for confirming lighting states of the light emitting elements.

Such as shown in FIG. 4, under the inspecting mode, the display 5 shows a picture 41 used for inspecting the light source. The picture 41 is partitioned into two regions, one of which is a confirmation region 41a for confirming the light-emission state, and the other of which is a setting region 41b for displaying a setting.

The confirmation region 41a shows the inspection image 43 formed by the image processor 10. The inspection image 43 includes a large number of blocks 42 corresponding to the respective light emitting elements. Colors of the blocks 42 are determined so as to be capable of distinguishing the colors of the light emitting elements corresponding to the respective blocks 42. For example, the colors of the blocks are determined such as to be blue relative to the blue-light emitting element, to be green relative to the green-light emitting element, to be red relative to the red-light emitting element, and to be white relative to the infrared-light emitting element. Owing to this, it is possible to easily confirm the color of the broken light emitting element. Instead of changing the color, indicias representing the colors may be provided inside or near the respective blocks 42 so as to be distinguishable. The indicias are, for example, B, G, R and IR.

The block 42 is adapted to change its density in accordance with an output level of the signal sent from the area CCD 24. In other words, when the light emitting element is normally turned on, the output level is high so that the block 42 is brightly displayed. By contrast, when the light emitting element is turned off or the light amount thereof decreases, the output level is low so that the block 42 is darkly displayed.

In a case that the first set 36 of the left side of the upper portion fails and all of the light emitting elements 36a to 36c are turned off, the three blocks 42 corresponding thereto are darkly displayed such as shown in FIG. 4. An inspector may recognize the failure of the first set 36 by watching the darkly displayed blocks 42.

The respective blocks 42 are arranged so as to represent the arrangement of the light emitting elements. Further, the respective blocks 42 show the light-emission state of each of the light emitting elements. Thus, it is easy to judge a number of the broken light emitting elements and the positions thereof.

For example, in case the number of the broken light emitting elements is a predetermined number or more, the LED unit 23 is exchanged. The inspector may obtain a definite criterion for judging whether the LED unit 23 is exchanged or not. Accordingly, when the failure of an identical degree has occurred, whether the LED unit 23 is changed or not is invariably judged without regard to the inspector. The judgement of the inspector is objectively kept to some extent.

The setting region 41b displays a color setting portion 46, a display renewing button 47, a current-value setting portion 48, and a closing button 49, which are operated with a mouse and a keyboard. The color setting portion 46 is for setting the color of the light emitting element to be turned on. The color setting portion 46 is provided with check boxes 46a of R(red), G(green), B(blue), and IR(infrared). When one of the check boxes 46a is checked, the light emitting elements of the checked color are turned on. Successively, the corresponding blocks 42 are displayed on the confirmation region 41a. In this way, the light-emission state of the light source may be confirmed every color.

Upon clicking the display renewing button 47, the inspection image is newly produced and is displayed as an up-to-date image. The current-value setting portion 48 is for setting a value of an electric current to be applied to the light emitting element every color. In virtue of this portion 48, a light-amount level of the light emitting element may be changed with respect to each color. The value of the electric current is inputted from a keyboard. The inputted values are indicated within input boxes 48a provided for the respective colors. When a setting button 48b is clicked, the light emitting elements are turned on again with the inputted value of the electric current. Upon clicking the closing button 49, the inspecting mode is over.

Figure 5:
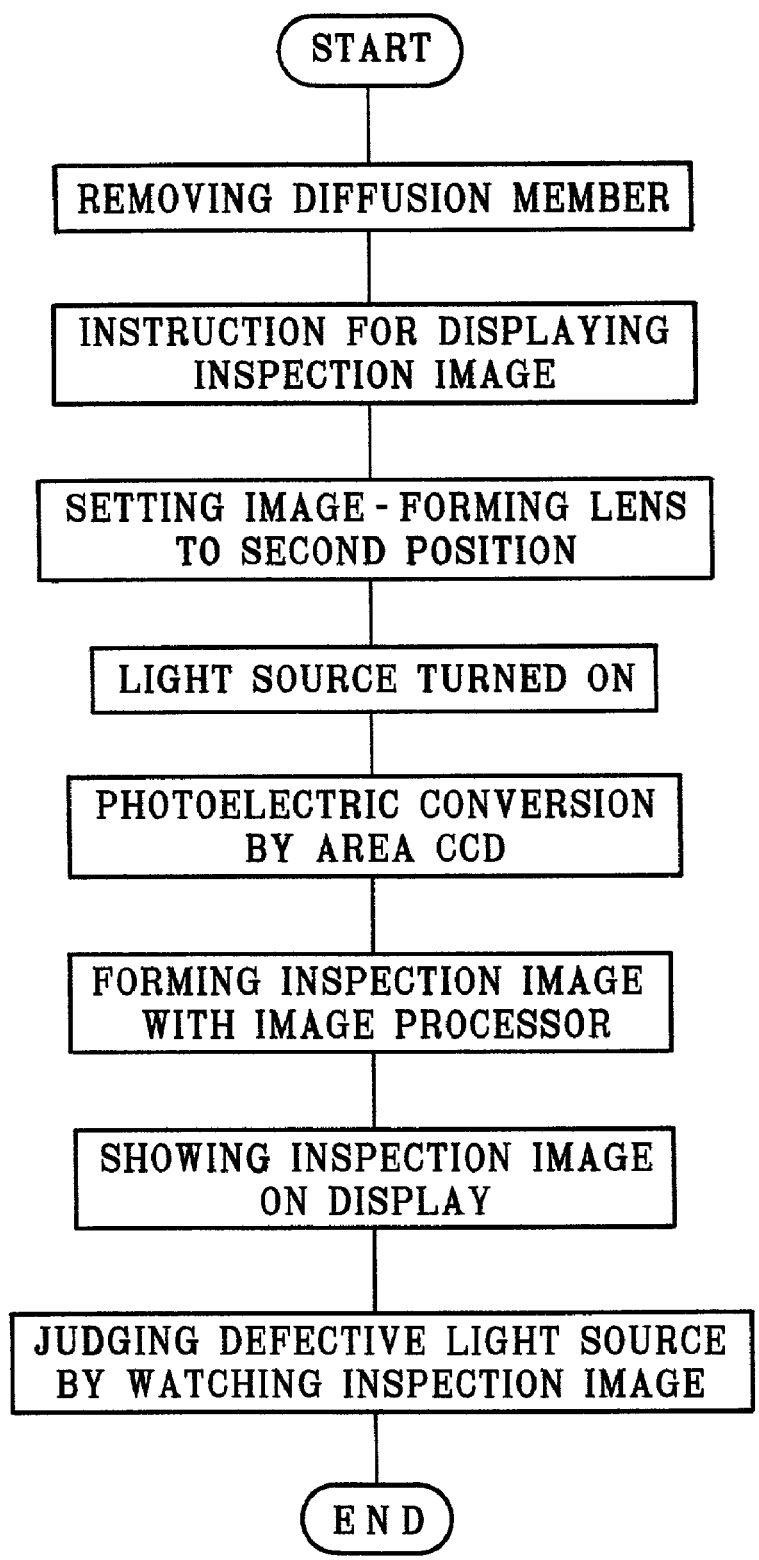
FIG. 5 is a flow chart showing a process for inspecting a light source.

Hereinafter, an inspecting process for the light source according to the above structure is described, referring to a flow chart shown in FIG. 5. When inspecting the failure of the light emitting element, the diffusion member 31 is removed first. Successively, the input apparatus 8 is activated to select the inspecting mode. At the same time, it is instructed to display the inspection image. Upon this, the moving mechanism 28 is actuated to set the image-forming lens 25 to the second position. The LED unit 23 emits the light of the respective colors in turn. The light of each color is received by the area CCD 24 and is converted into the electric signal. This electric signal is further converted into the digital data (lighting-state data) by the A-D converter 27.

The image processor 10 forms the inspection image 43 on the basis of the lighting-state data. The inspection image is displayed on the confirmation region 41a.

Under the inspecting mode, the diffusion member 31 is removed and the image-forming lens 25 is set to the second position so that the light-emission states of the light emitting elements are clearly displayed. Thus, a position of the failure is easily known.

The inspector confirms the light-emission states of the light emitting elements, watching the inspection image 43. Then, it is inspected from a number of the failures and positions thereof whether or not the LED unit 23 reaches a predetermined level for judging as good quality. When reaching the predetermined level, the LED unit 23 is judged as normal and the inspection is over. By contrast, when falling below the predetermined level, the LED unit 23 is judged as defect and is exchanged.

In the above embodiment, the display shows the inspection image indicating the light-emission state of the light source, and the inspector judges the defect by watching the inspection image. However, the input apparatus may automatically judge the defect on the basis of the light-emission states of the respective light emitting elements.

Figure 6:
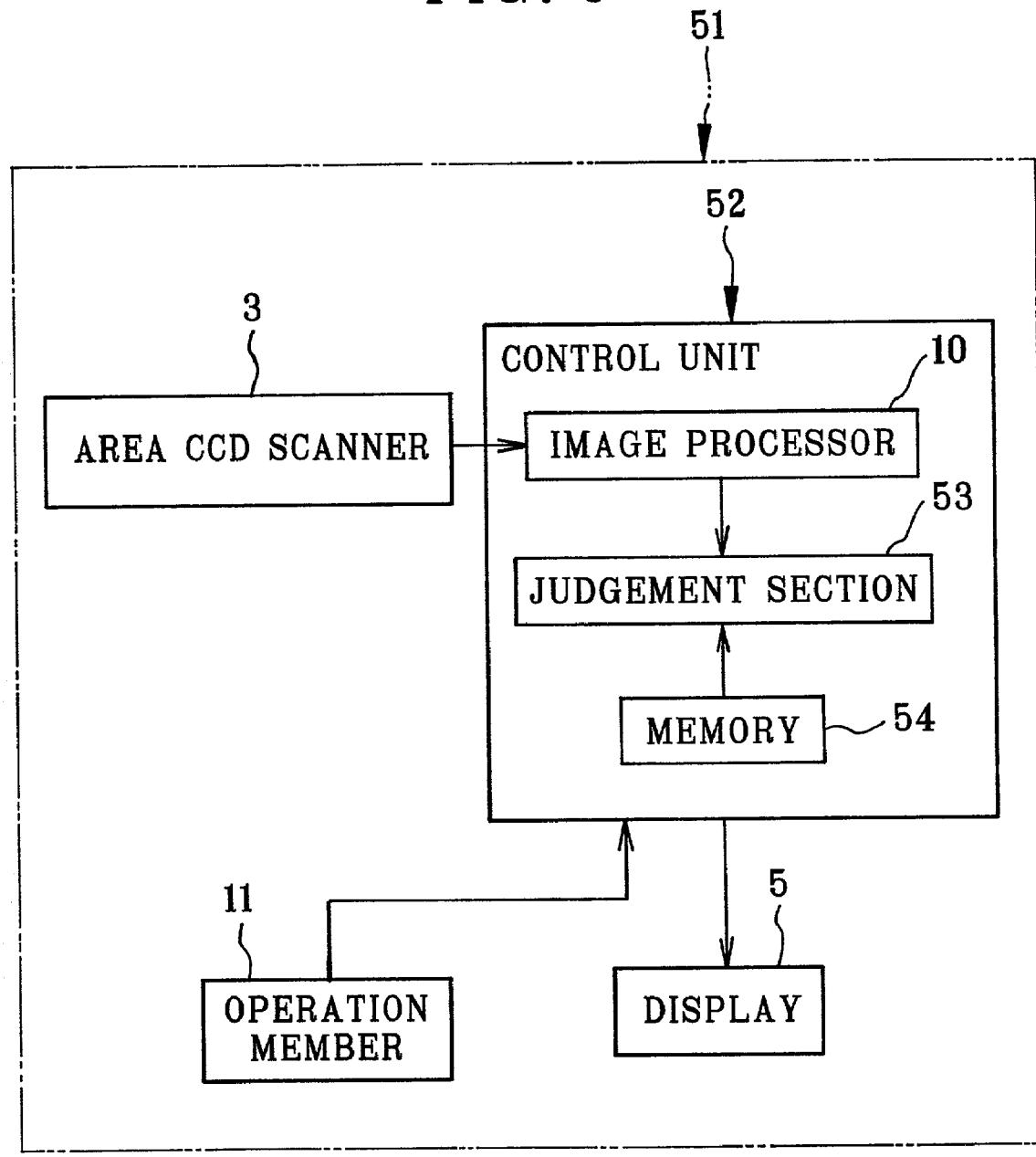
FIG. 6 is a block diagram showing a structure of an input apparatus automatically judging a defect of the light source.
Figure 7:
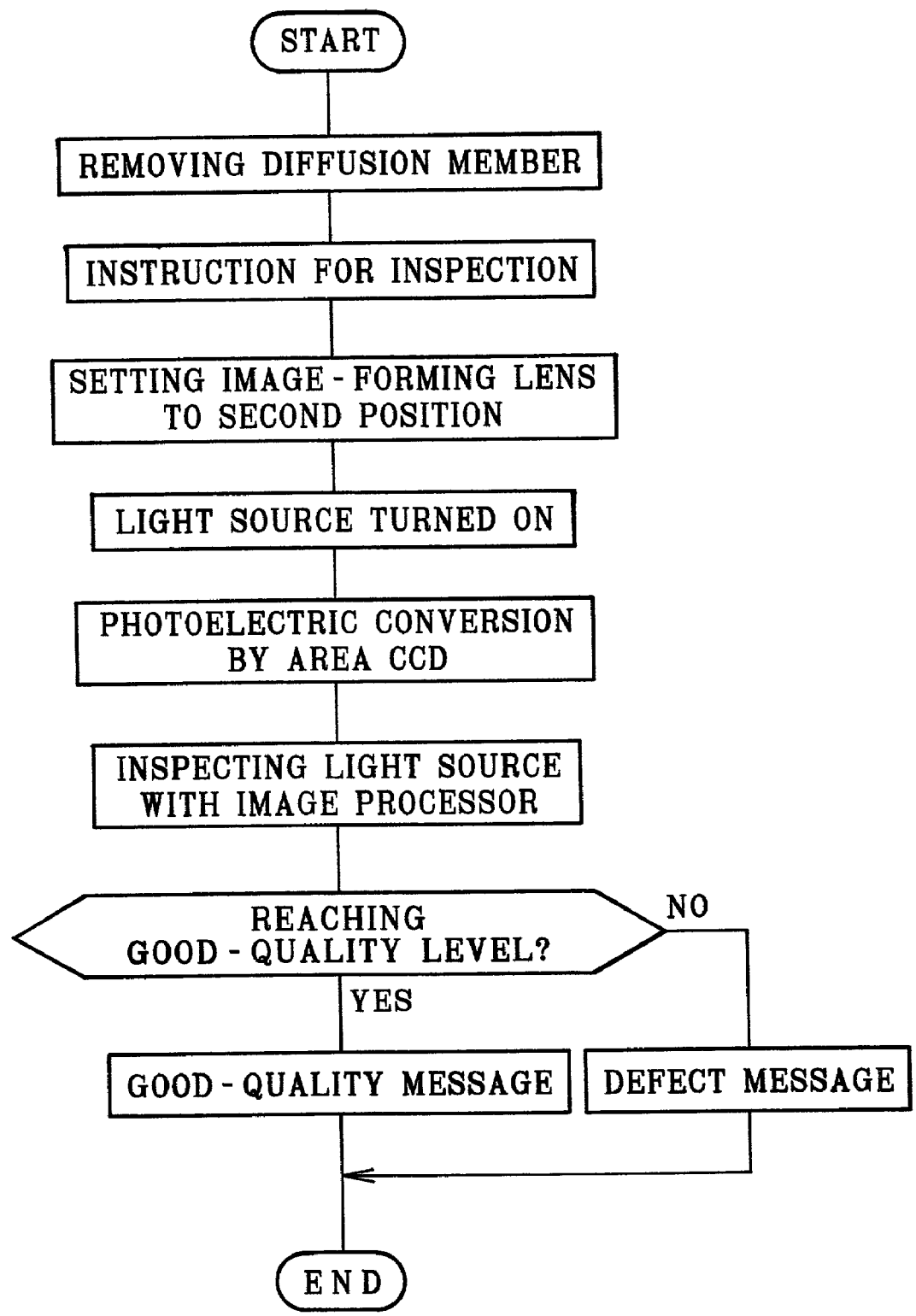
FIG. 7 is a flow chart showing an inspection process of the input apparatus shown in FIG. 6.

In this case, a judgment section 53 is provided in a control unit 52 of an input apparatus 51, such as shown in FIG. 6. A memory 54 stores, in advance, reference data for judging the LED unit 23 as good quality. Along a flow chart shown in FIG. 7, the image processor 10 inspects the light-emission states of the respective light emitting elements on the basis of the output level of the signal sent from the area CCD 24. In other words, the failure of the light emitting element is automatically detected to specify the color, the number, the positions, and so forth of the broken light emitting elements. Data obtained in this way is sent to the judgment section 53 as failure data.

On the basis of the failure data and the above-noted reference data, the judgement section 53 inspect whether or not the LED unit 23 reaches a good-quality level. When reaching the good-quality level, the LED unit 23 is judged as normal. In this case, a good-quality message is shown on the display 5, for example. By contrast, when falling below the good-quality level, the LED unit 23 is judged as defect. In the case of the defect, a defect message is shown on the display 5, for example. It is needless to say that the message may be vocally outputted. Alternatively, the message may be outputted in either of the above cases.

The arrangement of the light emitting elements is not exclusive to that described in the above embodiment. It is possible to adopt the other arrangement. For instance, although the three light emitting elements constitute one set in the above embodiment, it is unnecessary to constitute the set. Moreover, although the upper portion and the lower portion are provided in the above embodiment, it may be divided into four portions.

Figure 8:
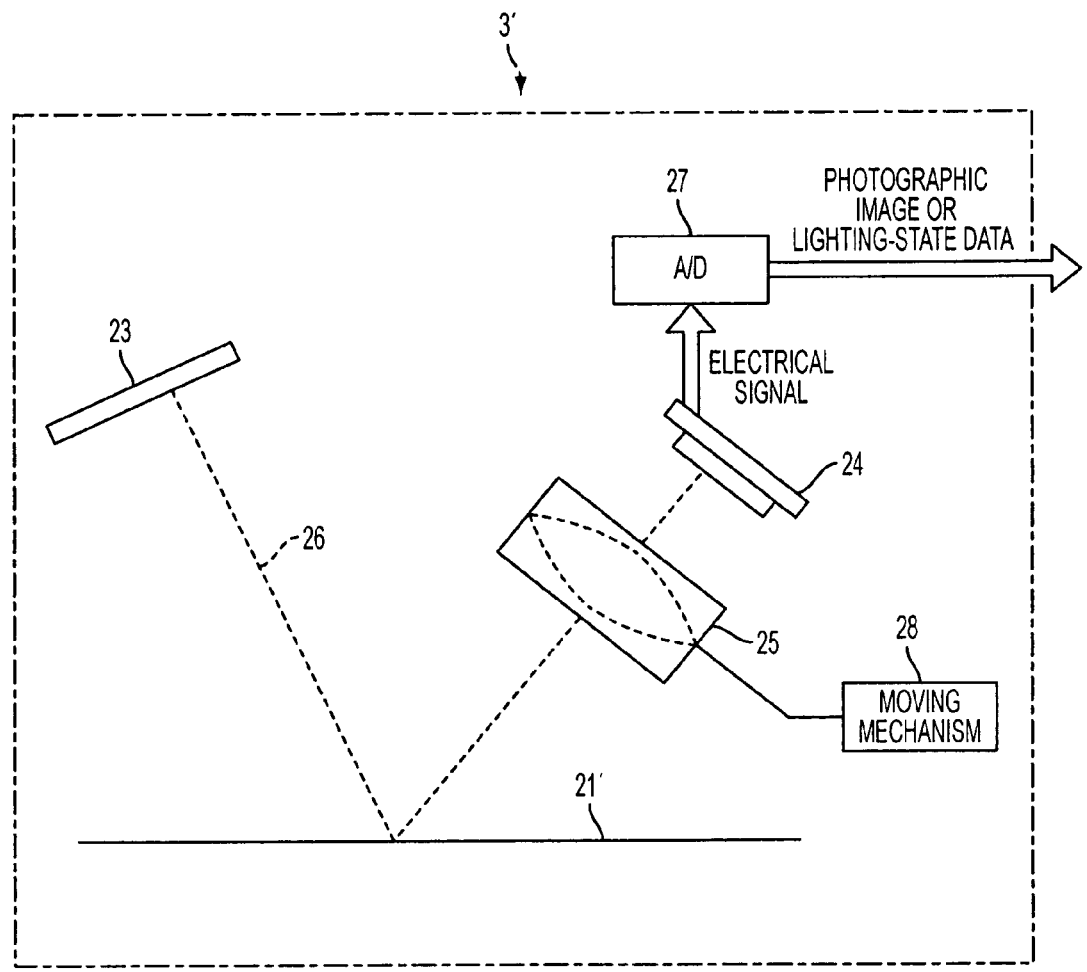
FIG. 8 illustrates a photoelectric converter that receives reflected light.

In the above embodiment, the photographic film is used as the original, and the image recorded thereon is read by the scanner. However, a recording sheet on which an image is recorded may be used as the original. In this case (as shown in FIG. 8), the light emitted from the light source 23 is reflected by the recording sheet 21', and the reflected light is read by, for example, a CCD of a reflection-original scanner 3'.

In the above embodiment, the area CCD scanner is employed. However, it is possible to employ a line CCD scanner reading the image line by line.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An inspecting method for a light source of an image reader reading an image recorded on an original, said light source including a plurality of light emitting elements and said image reader comprising a photoelectric converter for receiving a light emitted from said light source toward said original and for converting the received light into an electric signal, said inspecting method for the light source comprising the steps of:
   receiving the light of each of said light emitting elements with said photoelectric converter, the light being received without passing through said original;
   converting the received light into a photoelectric signal;
   forming an inspection image representing a light-emission state of each of said light emitting elements on the basis of said photoelectric signal;
   displaying said inspection image which includes marks deposited correspondingly to positions of said respective light emitting elements; and
   inspecting said light source by watching said light-emission states of said light emitting elements.

2. An inspecting method for a light source according to claim 1, wherein said image reader is disposed at an optical axis between said light source and said photoelectric converter, and said image reader includes a detachable diffusion member for diffusing the light of the respective light emitting elements when reading said image, said diffusion member being removed when displaying said light-emission state.

3. An inspecting method for a light source according to claim 2, wherein said image reader includes an image-forming lens, which is movable between a first position for forming said image on said photoelectric converter and a second position for forming an image of said light source on said photoelectric converter, said image-forming lens being set to said second position when displaying said light-emission state.

4. An inspecting method for a light source according to claim 3, comprising:
   providing an LED as said light emitting element.

5. An inspecting method for a light source according to claim 4, comprising:
   providing an area CCD as said photoelectric converter for receiving the light emitted from said LED.

6. The inspecting method of claim 1, wherein the original is one of a photographic film and a recording sheet.

7. The inspecting method of claim 1, wherein, when said image reader is in a reading mode, said photoelectric converter receives light emitted from said light source after said light passes through said original or after said light is reflected by said original.

8. An inspecting system for a light source of an image reader reading an image recorded on an original, said light source including a plurality of light emitting elements, said inspecting system for the light source comprising:
   a photoelectric converter for receiving a light emitted from said light source and for converting the received light into a photoelectric signal, the light being received by said photoelectric converter without passing through said original;

an image forming means for forming an inspection image representing a light-emission state of each of said light emitting elements on the basis of said photoelectric signal; and a display for showing said inspection image which includes marks deposited correspondingly to positions of said respective light emitting elements.

9. An inspecting system for a light source according to claim 8, wherein said image reader is disposed at an optical axis between said light source and said photoelectric converter, and said image reader includes a detachable diffusion member for diffusing the light of the respective light emitting elements when reading said image, said diffusion member being removed when showing said inspection image on said display.

10. An inspecting system for a light source according to claim 9, wherein said image reader includes an image-forming lens, which is movable between a first position for forming said image on said photoelectric converter and a second position for forming an image of said light source on said photoelectric converter, said image-forming lens being set to said second position when showing said inspection image on said display.

11. An inspecting system for a light source according to claim 10, wherein said inspection image represents the light-emission states of said light emitting elements in accordance with an arrangement thereof.

12. An inspecting system for a light source according to claim 8, wherein said light source includes the light emitting element for emitting infrared rays.

13. An inspecting system for a light source according to claim 12, wherein said light emitting element is an LED.

14. An inspecting system for a light source according to claim 13, wherein said photoelectric converter is an area CCD for receiving the light emitted from said LED.

15. The inspecting system of claim 8, wherein the original is one of a photographic film and a recording sheet.

16. The inspecting system of claim 8, wherein, when said image reader is in a reading mode, said photoelectric converter receives light emitted from said light source after said light passes through said original or after said light is reflected by said original.

17. An inspecting method for a light source of an image reader reading an image recorded on an original, said light source including a plurality of light emitting elements and said image reader comprising a photoelectric converter for receiving a light emitted from said light source toward said original and for converting the received light into an electric signal, said inspecting method for the light source comprising the steps of:

receiving the light of each of said light emitting elements with said photoelectric converter, the light being received without passing through said original;

converting the received light into a photoelectric signal;

inspecting a light-emission state of each of said light emitting elements on the basis of said photoelectric signal; and automatically judging whether said light source is a defect or not, on the basis of an inspection result of said light-emission state.

18. An inspecting method for a light source according to claim 17, wherein said image reader is disposed at an optical axis between said light source and said photoelectric converter, and said image reader includes a detachable diffusion member for diffusing the light of the respective light emitting elements when reading said image, said diffusion member being removed when inspecting said light-emission state.

19. An inspecting method for a light source according to claim 18, wherein said image reader includes an image-forming lens, which is movable between a first position for forming said image on said photoelectric converter and a second position for forming an image of said light source on said photoelectric converter, said image-forming lens being set to said second position when inspecting said light-emission state.

20. An inspecting method for a light source according to claim 19, comprising:

providing an LED as said light emitting element.

21. An inspecting method for a light source according to claim 20, comprising:

providing an area CCD as said photoelectric converter for receiving the light emitted from said LED.

22. The inspecting method of claim 17, wherein the original is one of a photographic film and a recording sheet.

23. The inspecting method of claim 17, wherein, when said image reader is in a reading mode, said photoelectric converter receives light emitted from said light source after said light passes through said original or after said light is reflected by said original.

24. The inspecting method of claim 17, comprising:

forming an inspection image representing a light-emission state of each of said light emitting elements on the basis of said photoelectric signal;

displaying said inspection image, which represents a positional arrangement of the light emitting elements, on a display.

25. The inspecting method of claim 17, wherein said photoelectric converter directly receives said light from said light emitting elements through said image-forming lens.

26. An inspecting system for a light source of an image reader reading an image recorded on an original, said light source including a plurality of light emitting elements, said inspecting system for the light source comprising:

a photoelectric converter for receiving a light emitted from said light source and for converting the received light into a photoelectric signal, the light being received by said photoelectric converter without passing through said original; and judgment means for inspecting a light-emission state of each of said light emitting elements on the basis of said photoelectric signal, said judgment means automatically judging whether said light source is a defect or not.

27. An inspecting system for a light source according to claim 26, wherein said image reader is disposed at an optical axis between said light source and said photoelectric converter, and said image reader includes a detachable diffusion member for diffusing the light of the respective light emitting elements when reading said image, said diffusion member being removed when inspecting said light-emission state.

28. An inspecting system for a light source according to claim 27, wherein said image reader includes an image-forming lens, which is movable between a first position for forming said image on said photoelectric converter and a second position for forming an image of said light source on said photoelectric converter, said image-forming lens being set to said second position when inspecting said light-emission state.

29. An inspecting system for a light source according to claim 26, wherein said light source includes the light emitting element for emitting infrared rays.

30. An inspecting system for a light source according to claim 29, wherein said light emitting element is an LED.

31. An inspecting system for a light source according to claim 30, wherein said photoelectric converter is an area CCD for receiving the light emitted from said LED.

32. The inspecting system of claim 26, wherein the original is one of a photographic film and a recording sheet.

33. The inspecting system of claim 26, wherein, when said image reader is in a reading mode, said photoelectric converter receives light emitted from said light source after said light passes through said original or after said light is reflected by said original.

34. The inspecting system of claim 26, comprising:

an image forming means for forming an inspection image representing a light-emission state of each of said light emitting elements on the basis of said photoelectric signal; and a display for showing said inspection image, which represents a positional arrangement of the light emitting elements.

35. The inspecting system of claim 26, wherein said photoelectric converter directly receives said light from said light emitting elements through said image-forming lens.

* * * * *